United States Patent
Kanaya et al.

(10) Patent No.: US 8,536,245 B2
(45) Date of Patent: Sep. 17, 2013

(54) INK COMPOSITION, RECORDING METHOD USING THE SAME, AND RECORDED MATTER

(75) Inventors: Miharu Kanaya, Izumino (JP); Tetsuya Aoyama, Shiojiri (JP); Masahiro Hanmura, Kawasaki (JP)

(73) Assignee: Seiko Epson Corporation, Tokyo (JP)

( * ) Notice: Subject to any disclaimer, the term of this patent is extended or adjusted under 35 U.S.C. 154(b) by 737 days.

(21) Appl. No.: 11/887,173

(22) PCT Filed: Mar. 28, 2006

(86) PCT No.: PCT/JP2006/306321
§ 371 (c)(1),
(2), (4) Date: Jan. 21, 2009

(87) PCT Pub. No.: WO2006/104157
PCT Pub. Date: Oct. 5, 2006

(65) Prior Publication Data
US 2009/0220748 A1  Sep. 3, 2009

(30) Foreign Application Priority Data

Mar. 28, 2005 (JP) .................. 2005-090808
Mar. 28, 2005 (JP) .................. 2005-090809

(51) Int. Cl.
*C09D 11/00* (2006.01)
(52) U.S. Cl.
USPC ........ 523/160; 523/161; 428/195.1; 524/522; 427/256
(58) Field of Classification Search
USPC ................................. 523/160, 161
See application file for complete search history.

(56) References Cited

U.S. PATENT DOCUMENTS

| 6,379,441 B1 * | 4/2002 | Kanaya et al. ............. 106/31.49 |
| 2003/0069329 A1 * | 4/2003 | Kubota et al. ................. 523/160 |
| 2005/0124742 A1 * | 6/2005 | Iwasaki et al. ................ 524/356 |

FOREIGN PATENT DOCUMENTS

| EP | 1 077 238 A1 | 2/2001 |
| EP | 1 262 529 A1 | 12/2002 |
| EP | 1 524 116 A1 | 4/2005 |
| JP | 11-209671 | 8/1998 |
| JP | 2000-007961 A | 1/2000 |
| JP | 2001-123098 | 5/2001 |
| JP | 2002-225414 | 8/2002 |
| JP | 2002-294134 | 10/2002 |
| JP | 2002-356637 | 12/2002 |
| JP | 2004-91627 | 3/2004 |
| JP | 2005-41994 | 2/2005 |

OTHER PUBLICATIONS

Machine Translation of Japanese Application 2004-091627 Filed March 25, 2004.

* cited by examiner

*Primary Examiner* — Doris Lee

(57) ABSTRACT

An ink composition comprises a pigment coated with a water-insoluble polymer as a coloring material, a resin emulsion as an additive, water, and a water-soluble organic compound. The weight average molecular weight of the water-insoluble polymer is from 50,000 to 150,000. The resin emulsion comprises a resin comprising a monomer component of the same kind as the monomer component constituting the water-insoluble polymer and has a weight average molecular weight of 1.5 to 4 times that of the water-insoluble polymer. The average particle size of the resin emulsion is from 20 to 200 nm, and the average particle size of pigment particles in the ink composition ranges from 50 to 150 nm.

12 Claims, No Drawings

INK COMPOSITION, RECORDING METHOD USING THE SAME, AND RECORDED MATTER

TECHNICAL FIELD

The present invention relates to an ink composition, and more particularly to an ink composition suitable for use in an ink jet recording system.

BACKGROUND ART

An ink jet recording system is a printing method in which droplets of an ink are rendered to fly and attach onto a recording medium such as paper to perform printing. By the recent innovative development of ink jet technology, an ink jet recording method has come to be used also in high-definition image recording (printing) which has hitherto been a field of photography or offset printing, and high-quality printing has been demanded not only to plain paper generally used and exclusive paper for ink jet recording (mat types and gloss types), but also to a recording medium such as printing paper.

As an ink used in ink jet recording, there is generally known an ink composition containing a coloring material acting as a coloring agent, water, an water-soluble organic compound, a surfactant and the like.

AS the coloring agent, a dye or a pigment is used. In particular, a water-soluble dye is used in a color ink in many cases for reasons of high chroma saturation of color, transparency, high solubility in water and the like. However, such a dye is generally insufficient in terms of light resistance and gas resistance, and also has a problem with water resistance because it is soluble in water. Accordingly, recorded matter recorded by the ink using the water-soluble dye has the disadvantage that it is poor in keeping quality of a recorded image. In contrast, a coloring agent insoluble in water is advantageous in water resistance. In particular, of the coloring agents insoluble in water, the pigment is a coloring material excellent in such light resistance, gas resistance and water resistance, so that the development of pigment inks taking advantage of this coloring material characteristic has been promoted. There have been proposed, for example, an aqueous pigment ink in which a pigment is dispersed with a surfactant or a polymer dispersant, an aqueous pigment ink using a self-dispersing pigment in which a water-dispersible functional group is imparted to a pigment surface, an aqueous pigment ink using fine colored particles in which a pigment is coated with a water-dispersible resin, and the like.

Such pigment inks are one in which pigment particles (including pigment-containing fine colored pigments) are stably dispersed in an ink solution. However, in the course of drying of the ink after the ink has been attached onto a recording medium such as paper, water and a volatile solvent evaporate, whereby a stable dispersion system is broken to cause easy occurrence of pigment coagulation. When the coagulated pigment precipitates on the recording medium such as paper, there is a problem that the smoothness of a surface thereof is lost, which causes a decrease in glossiness or deterioration in uniformity of a printed image to fail to obtain a high image quality image. Further, there has been a problem that a color having a hue different from an original hue comes to be seen by reflected light of the precipitated pigment (bronzing phenomenon), resulting in failure to obtain an image having a uniform desired hue. Furthermore, there have also been problems with fixing property that the pigment precipitated on the surface peels off by scratch, and problems with scratch resistance such as gloss change that when touched with a finger or the like, the pigment on the surface is scratched or broken to cause a change in glossy texture.

As for the image qualities of the ink pigment, it is proposed to restrict the particle size of a pigment dispersed in an ink (see patent document 1) and to incorporate a pigment and a pigment derivative at the same time (see patent document 2), for the purpose of improving glossiness, dispersibility and the like, and it is also proposed to incorporate fine polymer particles (see patent document 3) and to incorporate fine inorganic particles (see patent document 4), for the purpose of improving blurring and color developability. Further, there are proposed an ink containing a pigment-containing water-insoluble vinyl polymer dispersion (see patent document 5) and the like, for the purpose of improving print density in plain paper and glossiness in ink jet exclusive paper.

However, such pigment inks are also insufficient in glossiness and uniformity of printed images, and particularly have problems that the bronzing phenomenon in which a color having a hue different from an original hue comes to be seen by reflected light of the pigment coagulated on the surface of paper, fixing property of the inks and scratch resistance such as gloss change are inferior to the qualities of a water-soluble dye ink.

Patent Document 1: JP-A-2002-356637
Patent Document 2: JP-A-2002-294134
Patent Document 3: JP-A-2001-123098
Patent Document 4: JP-A-11-209671
Patent Document 5: JP-A-2005-41994

DISCLOSURE OF THE INVENTION

Problems to be Solved by the Invention

The invention has been made in view of the above-mentioned problems, and an object thereof is to provide an ink composition having good scratch resistance and particularly suitable for use in an ink jet recording system, which is an ink composition having no bronzing phenomenon to various recording media, particularly to a glossy recording medium, and capable of providing an image having excellent glossy texture.

Means for Solving the Problems

The present inventors have conducted intensive studies, and as a result, have obtained a finding that an ink composition containing a specific coloring agent coated with a water-insoluble polymer and a specific resin component can solve the above-mentioned problems. The invention is based on such a finding.

A first aspect of the invention relates to the following ink composition, recording method and recorded matter:

(1) An ink composition comprising at least a coloring agent coated with a water-insoluble polymer as a coloring material and a resin emulsion as an additive, wherein the weight average molecular weight of the water-insoluble polymer is from 50,000 to 150,000, and wherein the resin emulsion comprises a resin comprising a monomer component of the same kind as the monomer component constituting the water-insoluble polymer and having a weight average molecular weight of 1.5 to 4 times that of the water-insoluble polymer.

(2) The ink composition described in (1), wherein the above-mentioned coloring agent is a coloring agent insoluble in water.

(3) The ink composition described in (1) or (2), wherein the above-mentioned water-insoluble polymer and a polymer constituting the resin emulsion are branched polymers.

(4) The ink composition described in any one of (1) to (3), wherein the average particle size of the above-mentioned resin emulsion is from 20 to 200 nm.

(5) The ink composition described in any one of (1) to (4), wherein the above-mentioned coloring agent is a pigment, the above-mentioned ink composition further contains water and a water-soluble organic compound, and the average particle size of pigment particles in the ink composition ranges from 50 to 150 nm.

(6) The ink composition described in (5), wherein the above-mentioned water-soluble organic compound comprises at least a polyhydric alcohol, a solid wetting agent and a butyl ether of a glycol.

(7) The ink composition described in (6), wherein the polyhydric alcohol comprises two or more members selected from glycerol, diethylene glycol, triethylene glycol, 1,5-pentanediol and 1,2-hexanediol, the solid wetting agent is trimethylolethane, trimethylolpropane or urea, and the butyl glycol is diethylene glycol monobutyl ether or triethylene glycol monobutyl ether.

(8) The ink composition described in any one of (1) to (7), wherein it is used in an ink jet recording system.

(9) A recording method comprising a step of rendering the ink composition described in any one of (1) to (8) to attach onto a recording medium to perform printing.

(10) The recording method described in (9), wherein the method further comprises a step of ejecting droplets of the ink, and the droplets are rendered to attach onto the recording medium to perform printing.

(11) Recorded matter recorded by the recording method described in (9) or (10).

A second aspect of the invention relates to the following ink composition, recording method and recorded matter:

(12) An ink composition comprising at least a coloring agent coated with a water-insoluble polymer and resin particles, wherein the water-insoluble polymer is a polymer obtained by a solution polymerization process using at least a polymerizable unsaturated monomer and a polymerization initiator, wherein the coloring agent coated with the water-insoluble polymer is a coloring material obtained by a phase inversion emulsification process in which after the water-insoluble polymer is dissolved in an organic solvent, at least the coloring agent and water are added thereto, followed by mixing, and the organic solvent is removed to perform dispersion in an aqueous system, and wherein the resin particles are a polymer obtained by an emulsion polymerization process using at least a crosslinking agent.

(13) The ink composition described in (12), wherein the above-mentioned coloring agent is a coloring agent insoluble in water.

(14) The ink composition described in (12) or (13), wherein the above-mentioned water-insoluble polymer is a branched polymer.

(15) The ink composition described in any one of (12) to (14), wherein the above-mentioned resin particles comprise a polymer which does not form a film at a temperature of 40° C. or less.

(16) The ink composition described in any one of (12) to (15), wherein the average particle size of the above-mentioned resin particles is from 20 to 80 nm.

(17) The ink composition described in any one of (12) to (16), wherein the above-mentioned coloring agent is a pigment, the above-mentioned ink composition further contains water and a water-soluble organic compound, and the average particle size in the ink composition ranges from 50 to 150 nm.

(18) The ink composition described in (17), wherein the above-mentioned water-soluble organic compound comprises at least a polyhydric alcohol, a solid wetting agent and a butyl ether of a glycol.

(19) The ink composition described in (18), wherein the polyhydric alcohol comprises two or more members selected from glycerol, diethylene glycol, triethylene glycol, 1,5-pentanediol and 1,2-hexanediol, the solid wetting agent is trimethylolethane, trimethylolpropane or urea, and the butyl glycol is diethylene glycol monobutyl ether or triethylene glycol monobutyl ether.

(20) The ink composition described in any one of (12) to (19), wherein it is used in an ink jet recording system.

(21) A recording method comprising a step of rendering the ink composition described in any one of (12) to (20) to attach onto a recording medium to perform printing.

(22) The recording method described in (21), wherein the method further comprises a step of ejecting droplets of the ink, and the droplets are rendered to attach onto the recording medium to perform printing.

(23) Recorded matter recorded by the recording method described in (21) or (22).

BEST MODE FOR CARRYING OUT THE INVENTION

The ink composition based on the first aspect of the invention will be described in detail below, based on preferred embodiments thereof.

The ink composition of the first aspect of the invention is an ink composition comprising at least a coloring agent coated with a water-insoluble polymer and a resin emulsion, wherein the weight average molecular weight of the water-insoluble polymer is from 50,000 to 150,000, and wherein the resin emulsion comprises a resin comprising a monomer component of the same kind as the monomer component constituting the water-insoluble polymer and having a weight average molecular weight of 1.5 to 4 times that of the water-insoluble polymer.

These respective constituent elements will be described in detail below.

[Coloring Material]

The coloring material used in the ink composition of the first aspect of the invention is a coloring agent coated with at least a water-insoluble polymer, and the water-insoluble polymer used in this coloring material comprises a copolymer resin of a hydrophobic group-containing monomer and a hydrophilic group-containing monomer, and contains at least a residue of a monomer having a salt-forming group. The water-insoluble polymer as used herein means a polymer having a solubility of less than 1 g per 100 g of water at 25° C. after neutralization.

The hydrophobic group-containing monomers include methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate, vinyl esters such as vinyl acetate, vinylcyan compounds such as acrylonitrile and methacrylonitrile, aromatic vinyl monomers such as styrene, α-methylstyrene, vinyltoluene, 4-t-butylstyrene, chlorostyrene, vinylanisole and vinylnaphthalene, and the like. They can be used either alone or as a mixture of two or more members thereof.

The hydrophilic group-containing monomers include polyethylene glycol monomethacrylate, polypropylene glycol monomethacrylate, ethylene glycol.propylene glycol monomethacrylate and the like. They can be used either alone or as a mixture of two or more members thereof. In particular, the glossiness of a printed image is improved by using a monomer component constituting a branched chain such as polyethylene glycol (2-30) monomethacrylate, polyethylene glycol (1-15).propylene glycol (1-15) monomethacrylate, polypropylene glycol (2-30) methacrylate, methoxypolyethylene glycol (2-30) methacrylate, methoxypolytetramethylene glycol (2-30) methacrylate and methoxy(ethylene glycol-.propylene glycol copolymer) (1-30) methacrylate.

The salt-forming group-containing monomers include acrylic acid, methacrylic acid, styrenecarboxylic acid, maleic acid and the like. They can be used either alone or as a mixture of two or more members thereof.

Further, a macromonomer having a polymerizable functional group on one end, such as a styrenic macromonomer or a silicone-based macromonomer, or another monomer can also be used together.

The water-insoluble polymer in the first aspect of the invention is obtained by copolymerizing monomers by a known polymerization process such as a bulk polymerization process, a solution polymerization process, a suspension polymerization process or an emulsion polymerization process. However, the solution polymerization process is particularly preferred, and at the time of polymerization, a known radical polymerization agent or polymerization chain transfer agent may be added.

The coloring agent coated with the water-insoluble polymer in the first aspect of the invention can be obtained as an aqueous dispersion by dissolving the above-mentioned water-insoluble polymer in an organic solvent such as methanol, ethanol, isopropanol, n-butanol, acetone, methyl ethyl ketone or dibutyl ether, adding the coloring agent to the resulting solution, then, adding a neutralizing agent and water, performing kneading and dispersion treatment, thereby preparing an oil-in-water type dispersion, and removing the organic solvent from the resulting dispersion. For the kneading and dispersion treatment, there can be used, for example, a ball mill, a roll mill, a high-pressure homogenizer, a high-speed stirring type dispersing machine or the like.

As the neutralizing agent, preferred is ethylamine, a tertiary amine such as trimethylamine, lithium hydroxide, sodium hydroxide, potassium hydroxide, ammonium or the like, and the pH of the resulting aqueous dispersion is preferably from 6 to 10.

Further, as the water-insoluble polymer for coating, one having a weight average molecular weight of about 50000 to about 150000 is referred in terms of stably dispersing the coloring agent, particularly a pigment. The weight average molecular weight can be measured by a molecular weight analysis method according to gel permeation chromatography (GPC).

As the coloring agent used in the coloring agent coated with the water-insoluble polymer in the first aspect of the invention, there can be used existing dyes and pigments described in "Senryo Binran (Dye Handbook)" (publisher: Maruzen Co., Ltd.) and the like.

The coloring agent in the first aspect of the invention is preferably a coloring agent insoluble in water, and more preferably a pigment. As the pigment which can be used in the first aspect of the invention, there can be used both a known inorganic pigment and organic pigment. In addition to pigments such as Pigment Yellows, Pigment Reds, Pigment Violets, Pigment Blues and Pigment Blacks described in Color Index, there can be exemplified pigments of the phthalocyanine, azo, anthraquinone, azomethine and condensed ring families. Further, the pigments include organic pigments such as Yellow Nos. 4, 5, 205 and 401, Orange Nos. 228 and 405, Blue Nos. 1 and 404, and inorganic pigments such as titanium oxide, zinc oxide, zirconium oxide, iron oxide, ultramarine, Prussian blue and chromium oxide. For example, they are C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180 and 198, C.I. Pigment Red 1, 3, 5, 8, 9, 16, 17, 19, 22, 38, 57:1, 90, 112, 122, 123, 127, 146, 184, 202 and 209, C.I. Pigment Violet 1, 3, 5:1, 16, 19, 23 and 38, C.I. Pigment Blue 1, 2, 15, 15:1, 15:2, 15:3, 15:4 and 16, C.I. Pigment Black 1 and 7, and the like. The ink composition can also be formed by using a plurality of the pigments.

These pigments are preferably contained in the ink of the first aspect of the invention in an amount ranging from 0.5 to 8% by weight. When the content is less than 0.5% by weight, print density (color developability) is insufficient in some cases. Further, exceeding 8% by weight results in deterioration in glossiness on glossy media and the occurrence of defects in reliability such as nozzle clogging and instability of ejection in some cases.

Further, from the viewpoints of dispersion stability, storage stability of the ink and prevention of nozzle clogging, and from the viewpoint of glossiness on glossy media, it is preferred that the weight ratio of the coloring agent and the water-insoluble polymer is coloring agent:water-insoluble polymer=1:0.2 to 1:1. For details, when the water-insoluble polymer is less than 20% based on the coloring gent, stable dispersion can not be performed to cause the occurrence of coagulation of the coloring agent. More than 100% based on the coloring agent results in a reduction in color development and also deterioration in glossiness on glossy media, although the bronzing phenomenon decreases.

Furthermore, from the viewpoints of color development and glossiness on glossy media, the average particle size of pigment particles in the ink composition is preferably within the range of 50 to 150 nm. The average particle size of these can be obtained by particle size measurement with a Microtrac UPA150 analyzer (manufactured by Microtrac Inc.), an LPA3100 particle size distribution measuring instrument (manufactured by Otsuka Electronics Co., Ltd.) or the like.

In addition, the coloring agent coated with the water-insoluble polymer in the first aspect of the invention may be in a form that the coloring agent is not completely coated with the water-insoluble polymer and is partially exposed.

[Resin Emulsion]

The resin emulsion in the first aspect of the invention comprises a resin obtained from a monomer component of the same kind as the monomer component constituting the above-mentioned water-insoluble polymer. The term "a resin obtained from a monomer component of the same kind" as used herein means a resin comprising a copolymer resin of a hydrophobic group-containing monomer and a hydrophilic group-containing monomer and containing at least a residue of a monomer having a salt-forming group, similarly to the above-mentioned water-insoluble polymer.

The hydrophobic group-containing monomers include methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate, vinyl esters such as vinyl acetate, vinylcyan compounds such as acrylonitrile and methacrylonitrile, aromatic vinyl monomers such as styrene, α-methylstyrene, vinyltoluene, 4-t-butylstyrene, chlorostyrene, vinylanisole and vinylnaphthalene, and the like. They can be used either alone or as a mixture of two or more members thereof.

The hydrophilic group-containing monomers include polyethylene glycol monomethacrylate, polypropylene glycol monomethacrylate, ethylene glycol-propylene glycol monomethacrylate and the like. They can be used either alone or as a mixture of two or more members thereof. In particular, the glossiness of a printed image is improved by using a monomer component constituting a branched chain such as polyethylene glycol (2-30) monomethacrylate, polyethylene glycol (1-15).propylene glycol (1-15) monomethacrylate, polypropylene glycol (2-30) methacrylate, methoxypolyethylene glycol (2-30) methacrylate, methoxypolytetramethylene glycol (2-30) methacrylate or methoxy(ethylene glycol-.propylene glycol copolymer) (1-30) methacrylate.

The salt-forming group-containing monomers include acrylic acid, methacrylic acid, styrenecarboxylic acid, maleic acid and the like. They can be used either alone or as a mixture of two or more members thereof.

Further, a macromonomer having a polymerizable functional group on one end, such as a styrenic macromonomer or a silicone-based macromonomer, or another monomer can also be used together.

The water-insoluble polymer in the first aspect of the invention is obtained by copolymerizing monomers by a known polymerization process such as a bulk polymerization process, a solution polymerization process, a suspension polymerization process or an emulsion polymerization process. However, the solution polymerization process is particularly preferred, and in the case of polymerization, a known radical polymerization agent or polymerization chain transfer agent may be added.

The resin obtained by polymerization is dissolved in an organic solvent, a neutralizing agent and water are added, dispersion treatment is performed, and the organic solvent is removed from the resulting dispersion, thereby being able to obtain it as a resin emulsion.

As the neutralizing agent, preferred is ethylamine, a tertiary amine such as trimethylamine, lithium hydroxide, sodium hydroxide, potassium hydroxide, ammonium or the like is preferred, and the pH of the resulting aqueous dispersion is preferably from 6 to 10.

The use of this resin emulsion in combination with the coloring agent coated with the water-insoluble polymer can prevent a reduction in color development which occurs with an increase in the ratio of the water-insoluble polymer to the coloring agent and deterioration in glossiness on glossy media, and further, improves fixing property and scratch resistance such as gloss change, associated with an increase in the amount of the resin component in the ink composition.

In general, when in a dispersion in which a coloring agent is dispersed with a polymer dispersant, a polymer such as a resin emulsion is used as an additive in combination therewith, there is a problem that adsorption and desorption occur in the polymer as the dispersant and the polymer as the additive to the coloring agent to destroy dispersion stability, resulting in deterioration in storage stability. However, the resin of the resin emulsion in the first aspect of the invention has a structure similar to that of the water-insoluble polymer with which the coloring agent is coated, thereby being able to keep a stable dispersion state even when adsorption and desorption of the water-insoluble polymer and the resin of the resin emulsion have occurred in the ink composition.

Further, the resin of the resin emulsion in the first aspect of the invention is a polymer having a weight average molecular weight of 1.5 to 4 times that of the water-insoluble polymer, thereby being able to provide the ink composition good in fixing property and high in reliability. This is because when the weight average molecular weight of the resin is less than 1.5 times that of the water-insoluble polymer, fixing action is insufficient, whereas exceeding 4 times provides a defect to reliability such as ejection stability.

Furthermore, from the viewpoints of dispersion stability, glossiness of a recorded image and improvement in bronzing, it is preferred that the average particle size of the resin emulsion is within the range of 20 to 200 nm. The average particle size of these can be obtained by particle size measurement with a Microtrac UPA150 analyzer (manufactured by Microtrac Inc.), an LPA3100 particle size distribution measuring instrument (manufactured by Otsuka Electronics Co., Ltd.) or the like.

The ink composition based on the second aspect of the invention will be described in detail below, based on preferred embodiments thereof.

The ink composition of the second aspect of the invention is an ink composition comprising at least a coloring agent coated with a water-insoluble polymer and resin particles, wherein the water-insoluble polymer is a polymer obtained by a solution polymerization process using at least a polymerizable unsaturated monomer and a polymerization initiator, wherein the coloring agent coated with the water-insoluble polymer is a coloring material obtained by a phase inversion emulsification process in which after the water-insoluble polymer is dissolved in an organic solvent, at least the coloring agent and water are added thereto, followed by mixing, and the organic solvent is removed to perform dispersion in an aqueous system, and wherein the resin particles are a polymer obtained by an emulsion polymerization process using at least a polymerizable unsaturated monomer and a crosslinking agent.

These respective constituent elements will be described in detail below.

[Coloring Material]

As the coloring material used in the ink composition of the second aspect of the invention, there can be used existing dyes and pigments described in "Senryo Binran (Dye Handbook)" (publisher: Maruzen Co., Ltd.) and the like.

The coloring agent in the second aspect of the invention is preferably a coloring agent insoluble in water, and more preferably a pigment. As the pigment which can be used in the second aspect of the invention, there can be used both a known inorganic pigment and organic pigment. In addition to pigments such as Pigment Yellows, Pigment Reds, Pigment Violets, Pigment Blues and Pigment Blacks described in Color Index, there can be exemplified pigments of the phthalocyanine, azo, anthraquinone, azomethine and condensed ring families. Further, the pigments include organic pigments such as Yellow Nos. 4, 5, 205 and 401, Orange Nos. 228 and 405, Blue Nos. 1 and 404, and inorganic pigments such as titanium oxide, zinc oxide, zirconium oxide, iron oxide, ultramarine, Prussian blue and chromium oxide. For example, they are C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180 and 198, C.I. Pigment Red 1, 3, 5, 8, 9, 16, 17, 19, 22, 38, 57:1, 90, 112, 122, 123, 127, 146, 184, 202 and 209, C.I. Pigment Violet 1, 3, 5:1, 16, 19, 23 and 38, C.I. Pigment Blue 1, 2, 15, 15:1, 15:2, 15:3, 15:4 and 16, C.I. Pigment Black 1 and 7, and the like. The ink composition can also be formed by using a plurality of the pigments.

These pigments are preferably contained in the ink of the second aspect of the invention in an amount ranging from 0.5 to 8% by weight. When the content is less than 0.5% by weight, print density (color developability) is insufficient in some cases. Further, exceeding 8% by weight results in deterioration in glossiness on glossy media and the occurrence of defects in reliability such as nozzle clogging and instability of ejection in some cases.

[Coloring Material: Coloring Agent Coated with Water-Insoluble Polymer]

The water-insoluble polymer used in the coloring agent coated with the water-insoluble polymer in the second aspect of the invention is a polymer obtained by an emulsion polymerization process using at least a polymerizable unsaturated monomer and a crosslinking agent. The water-insoluble polymer as used herein means a polymer having a solubility of less than 1 g per 100 g of water at 25° C. after neutralization.

The polymerizable unsaturated monomers include vinyl aromatic hydrocarbons, methacrylic acid esters, methacrylamide, alkyl-substituted methacrylamide, maleic anhydride, vinylcyan compounds, methyl vinyl ketone, vinyl acetate and the like. Specific examples thereof include styrene, α-methylstyrene, vinyltoluene, 4-t-butylstyrene, chlorostyrene, vinylanisole, vinylnaphthalene, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, acrylonitrile, methacrylonitrile and the like. They can be used either alone or as a mixture of two or more members thereof.

Further, in order to impart the glossiness of a printed image, the water-insoluble polymer in the second aspect of the invention preferably contains a hydrophilic group-containing monomer and a salt-forming group-containing monomer as constituent components thereof.

The hydrophilic group-containing monomers include polyethylene glycol monomethacrylate, polypropylene glycol monomethacrylate, ethylene glycol.propylene glycol monomethacrylate and the like. They can be used either alone or as a mixture of two or more members thereof. In particular, the glossiness of a printed image is further improved by using a monomer component constituting a branched chain such as polyethylene glycol (2-30) monomethacrylate, polyethylene glycol (1-15) propylene glycol (1-15) monomethacrylate, polypropylene glycol (2-30) methacrylate, methoxypolyethylene glycol (2-30) methacrylate, methoxypolytetramethylene glycol (2-30) methacrylate or methoxy(ethylene glycol-.propylene glycol copolymer) (1-30) methacrylate.

The salt-forming group-containing monomers include acrylic acid, methacrylic acid, styrenecarboxylic acid, maleic acid and the like. They can be used either alone or as a mixture of two or more members thereof.

Further, a macromonomer having a polymerizable functional group on one end, such as a styrenic macromonomer or a silicone-based macromonomer, or another monomer can also be used together.

Furthermore, at the time of polymerization, a known radical polymerization agent or polymerization chain transfer agent may be added.

The coloring agent coated with the water-insoluble polymer, which is used in the second aspect of the invention, is one obtained by a phase reversal emulsifying method. That is to say, it can be obtained as an aqueous dispersion by dissolving the above-mentioned water-insoluble polymer in an organic solvent such as methanol, ethanol, isopropanol, n-butanol, acetone, methyl ethyl ketone or dibutyl ether, adding the coloring agent to the resulting solution, then, adding a neutralizing agent and water, performing kneading and dispersion treatment, thereby preparing an oil-in-water type dispersion, and removing the organic solvent from the resulting dispersion. For the kneading and dispersion treatment, there can be used, for example, a ball mill, a roll mill, a high-pressure homogenizer, a high-speed stirring type dispersing machine or the like.

As the neutralizing agent, preferred is ethylamine, a tertiary amine such as trimethylamine, lithium hydroxide, sodium hydroxide, potassium hydroxide, ammonium or the like, and the pH of the resulting aqueous dispersion is preferably from 6 to 10.

Further, as the water-insoluble polymer for coating, one having a weight average molecular weight of about 10000 to about 150000 is referred in terms of stably dispersing the coloring agent, particularly a pigment. The weight average molecular weight can be measured by a molecular weight analysis method according to gel permeation chromatography (GPC).

Furthermore, from the viewpoints of color development and glossiness on glossy media, the average particle size thereof in the ink composition is preferably within the range of 50 to 150 nm. The average particle size of these can be obtained by particle size measurement with a Microtrac UPA150 analyzer (manufactured by Microtrac Inc.), an LPA3100 particle size distribution measuring instrument (manufactured by Otsuka Electronics Co., Ltd.) or the like.

In addition, the coloring agent coated with the water-insoluble polymer in the second aspect of the invention may be in a form that the coloring agent is not completely coated with the water-insoluble polymer and is partially exposed.

[Resin Particles]

The resin which forms the resin particles is preferably one or two or more members selected from the group consisting of an acrylic resin, a methacrylic resin, a styrenic resin, a urethane-based resin, an acrylamide-based resin and an epoxy-based resin. These resins may be either a homopolymer or a copolymer, and both of monophase structure and multiphase structure (core-shell type) can be used. However, the resin used in the second aspect of the invention is a resin internally crosslinked by using a crosslinking agent.

In general, when in a dispersion in which a coloring agent is dispersed with a polymer dispersant, a polymer such as a resin emulsion is used as an additive in combination therewith, there is a problem that adsorption and desorption occur in the polymer as the dispersant and the polymer as the additive to the coloring agent to destroy dispersion stability, resulting in deterioration in storage stability. However, in the second aspect of the invention, it is considered that the adsorption and desorption of the water-insoluble polymer and the resin particles are inhibited by that the coloring agent is coated with the water-insoluble polymer by the phase reversal emulsifying method, and is therefore stable as dispersed particles, that the fine resin particles are internally crosslinked, so that they exist as strong resin particles, and that the resin particles produced by the emulsion polymerization process contain a slight amount of surfactant (surfactant used in polymerization) which can not be removed. It is considered that dispersion stability is maintained thereby.

Further, the resin particles used in the second aspect of the invention is preferably a polymer which does not form a film at a temperature of 40° C. or less. The addition of the resin particles in the second aspect of the invention does not aim at an improvement in fixing property and scratch resistance by the film formation of the resin, but intends to improve surface slipperiness by leaving the fine particles on a surface of a recording medium, thereby preventing the peeling-off of the coloring agent by scratch and gloss change. The use of the polymer which does not form a film at a temperature of 40° C. or less has an advantage that reliability such as clogging recovery is remarkably excellent, compared to the case using a polymer which forms a film.

The resin particles used in the second aspect of the invention is preferably incorporated into the ink composition in a form of an emulsion of the resin particles (for example, a so-called "acrylic emulsion"). The reason for this is that when the resin particles are added to the ink composition as such, the dispersion of the resin particles becomes insufficient in some cases, so that the emulsion form is preferred in respect to the production of the ink.

The emulsion of the resin particles (such as the acrylic emulsion) can be obtained by a known emulsion polymerization process. For example, it can be obtained by emulsion polymerizing an unsaturated monomer (such as an unsaturated vinyl monomer) in water to which a polymerization initiator and a surfactant are incorporated.

The unsaturated monomers include acrylic acid esters, methacrylic acid esters, aromatic vinyl monomers, vinyl esters, vinylcyan compound monomers, halogenated monomers, olefin monomers, diene monomers and the like. Specific examples thereof include acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate and glycidyl acrylate; methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate; vinyl esters such as vinyl acetate; vinylcyan compounds such as acrylonitrile and methacrylonitrile; halogenated monomers such as vinylidene chloride and vinyl chloride; aromatic vinyl monomers such as styrene, α-methylstyrene, vinyltoluene, 4-t-butylstyrene, chlorostyrene, vinylanisole and vinylnaphthalene; olefins such as ethylene and propylene; dienes such as butadiene and chloroprene; vinyl monomers such as vinyl ether, vinyl ketone and vinylpyrrolidone; unsaturated carboxylic acids such as acrylic acid, methacrylic acid, itaconic acid, fumaric acid and maleic acid; acrylamides such as acrylamide, methacrylamide and N,N'-dimethylacrylamide; hydroxyl group-containing monomers such as 2-hydroxyethyl acrylate, 2-hydroxypropyl acrylate, 2-hydroxyethyl methacrylate and 2-hydroxypropyl methacrylate; and the like. They can be used either alone or as a mixture of two or more members thereof.

Further, as the crosslinking agent, there can be used a crosslinkable monomer having two or more polymerizable double bonds. Examples of the crosslinkable monomers having two or more polymerizable double bonds include diacrylate compounds such as polyethylene glycol diacrylate, triethylene glycol diacrylate, 1,3-butylene glycol diacrylate, 1,4-butylene glycol diacrylate, 1,6-hexenediol diacrylate, neopentyl glycol diacrylate, 1,9-nonanediol diacrylate, polypropylene glycol diacrylate, 2,2'-bis(4-acryloxypropyloxyphenyl)propane and 2,2'-bis(4-acryloxydiethoxyphenyl) propane; triacrylate compounds such as trimethylolpropane triacrylate, trimethylolethane triacrylate and tetramethylolmethane triacrylate; tetraacrylate compounds such as ditrimethylol tetraacrylate, tetramethylolmethane tetraacrylate and pentaerythritol tetraacrylate; hexaacrylate compounds such as dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate and 2,2'-bis(4-methacryloxydiethoxyphenyl) propane; trimethacrylate compounds such as trimethylolpropane trimethacrylate and trimethylolethane trimethacrylate; methylenebisacrylamide; divinylbenzene; and the like. They can be used either alone or as a mixture of two or more thereof.

Further, in addition to the polymerization initiator and surfactant used in emulsion polymerization, a chain transfer agent and further a neutralizing agent may also be used based on conventional methods. In particular, as the neutralizing agent, preferred is ammonia or a hydroxide of an inorganic alkali, for example, sodium hydroxide, potassium hydroxide or the like.

In the second aspect of the invention, from the viewpoint of more effectively obtaining ink jet proper physical properties of the ink, reliability (clogging, ejection stability and the like), fixing property, glossiness and the like, it is preferred that the resin particles are contained in the ink of the second aspect of the invention in an amount ranging from 0.1 to 5% by weight.

On the other hand, in order to obtain the action of improving scratch resistance by increasing slipperiness of a recording medium surface by the particles without deteriorating dispersion stability in the ink composition and glossiness of a recorded image, the average particle size of the resin particles used in the second aspect of the invention is preferably from 20 to 80 nm. The average particle size of these can be obtained by particle size measurement with a Microtrac UPA150 analyzer (manufactured by Microtrac Inc.), an LPA3100 particle size distribution measuring instrument (manufactured by Otsuka Electronics Co., Ltd.) or the like.

[Water-Soluble Organic Compound]

The ink composition based on the first aspect of the invention and the ink composition based on the second aspect of the invention (hereinafter each simply referred to as "the ink composition of the invention" or "the ink composition") are an ink composition suitable for an ink jet recording process, and contain water and a water-soluble organic compound. Water is a main solvent, and it is preferred to use pure water such as ion exchange water, ultrafiltration water, reverse osmosis water or distilled water, or ultrapure water. In particular, the use of ultrapure water sterilized by ultraviolet irradiation or the addition of hydrogen peroxide is preferred in that the occurrence of molds and bacteria is prevented to make possible long-term storage of the ink.

The above-mentioned water-soluble organic compounds include, for example: polyhydric alcohols such as glycerol, 1,2,6-hexanetriol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol and 4-methyl-1,2-pentandiol; so-called solid wetting agents including trimethylolethane, methylolpropane, saccharides such as glucose, mannose, fructose, ribose, xylose, arabinose, galactose, an aldonic acid, glucitol (sorbit) maltose, cellobiose, lactose, sucrose, trehalose and maltotriose, sugar alcohols, hyaluronic acids and ureas; alkyl alcohols having 1 to 4 carbon atoms such as ethanol, methanol, butanol, propanol and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether and dipropylene glycol mono-iso-propyl ether, 2-pyrrolidone, N-methyl-2-pyrrolidone, 1,3-dimethyl-2-imidazolidinone, formamide, acetamide, dimethyl sulfoxide, sorbit, sorbitan, acetin, diacetin, triacetin, sulfolane and the like. One or two or more members of them can be used, and these water-soluble organic compounds are preferably used in the ink composition in an amount of 10 to 50% by weight, from the viewpoints of ensuring proper physical properties (viscosity and the like) of the ink composition, and ensuring print quality and reliability.

Further, in the invention, at least the polyhydric alcohol, the solid wetting agent and the glycol butyl ether are used together as the water-soluble organic compound, thereby being able to provide the ink composition excellent in print quality and in reliability such as ejection stability and clogging recovery. This is because the polyhydric alcohol and the solid wetting agent are suitable for controlling water retention (moisture retention) and permeability of the ink composition in recording media such as plain paper, and because the glycol butyl ether is suitable for controlling ejection stability and permeability of the ink composition in recording media, and the ink composition high in print quality and reliability such as ejection stability and clogging recovery can be provided by using these together.

As the particularly preferred water-soluble organic compounds, the polyhydric alcohol is the combined use of two or more members selected from glycerol, diethylene glycol, triethylene glycol, 1,5-pentanediol and 1,2-hexanediol, the solid wetting agent is trimethylolethane, trimethylolpropane or urea, and the butyl glycol is diethylene glycol monobutyl ether or triethylene glycol monobutyl ether.

[Other Additives]

Further, in order to control wettability to a recording medium of the ink, impart uniform glossiness, and obtain permeability in a recording medium and print stability in an ink jet recording method, a surface tension adjuster is preferably contained. As the surface tension adjuster, an acetylene glycol-based surfactant or a polyether-modified siloxane is preferred.

Examples of the acetylene glycol-based surfactants include Surfynol 420, 440, 465, 485, 104 and STG (products of Air Products and Chemicals, Inc.), Olfine PD-001, SPC, E1004 and E1010 (products of Nissin Chemical Industry Co., Ltd.), Acetylenol E00, E40, E100 and LH (products of Kawaken Fine Chemicals Co., Ltd) and the like. Further, the polyether-modified siloxanes include BYK-346, 347, 348 and UV3530 (products of BYK-Chemie GmbH) and the like. Plural members of these may be used in the ink composition. It is preferred that the surface tension is adjusted to 20 to 40 mN/m, and they are contained in the ink in an amount of 0.1 to 3.0% by weight.

Furthermore, the ink composition of the invention preferably contains a pH adjuster.

As the pH adjuster, there can be used an alkali metal oxide such as lithium hydroxide, potassium hydroxide or sodium hydroxide, an amine such as ammonia, triethanolamine, tripropanolamine or diethanolamine, and the like. Preferably, the ink composition contain at least one kind of pH adjuster selected from an alkali metal hydroxide, ammonia, triethanolamine and tripropanolamine, and the pH is preferably adjusted to 6 to 10. When the pH deviates from this range, materials constituting an ink jet printer, and the like are adversely affected, or clogging recovery deteriorates.

Further, an antifoaming agent, an antioxidant, an ultraviolet absorber, an antiseptic•mildewproofing agent or the like can also be added as needed.

The ink composition of the invention can be suitably used for writing materials such as pens, stamps and the like, and more suitably used as an ink set for ink jet recording. In the invention, the ink jet recording system means a system in which an ink is ejected from fine nozzles as liquid droplets to render the liquid droplets to attach onto a recording medium. Description will be specifically made below.

As a first method, there is an electrostatic attraction system. This system is a system of applying a strong electric field between a nozzle and an accelerating electrode disposed in front of the nozzle to continuously spray an ink in liquid droplet form from the nozzle, and imparting a printing information signal to deflecting electrodes while the ink droplets fly between the deflecting electrodes, thereby performing printing, or a system of spraying ink droplets without deflection, corresponding to a printing information signal.

A second method is a system of applying pressure to an ink solution with a small pump, and mechanically vibrating a nozzle with a quartz oscillator or the like, thereby forcibly spraying ink droplets. The ink droplets sprayed are charged at the same time that they are sprayed, and a printing information signal is imparted to deflecting electrodes while the ink droplets fly between deflecting electrodes, thereby performing printing.

A third method is a system using a piezoelectric element, and a system of simultaneously applying pressure and a printing information signal to an ink solution with the piezoelectric element, and spraying ink droplets to perform printing.

A fourth method is a system of abruptly expanding the volume of an ink solution by the action of thermal energy, and a system of heating and foaming the ink solution with microelectrodes according to a print information signal, thereby spraying ink droplets and performing printing.

All the systems described above can be used in the ink jet recording method using the ink composition of the invention.

The recorded matter of the invention is one in which recording has been made using at least the above-mentioned ink composition. By using the ink composition of the invention, this recorded matter is provided as recorded matter which is excellent in color development and has glossy texture, and further, as recorded matter good in scratch resistance.

EXAMPLES

The invention will be illustrated in greater detail with reference to the following examples, but the invention should not be construed as being limited thereto.

Examples 1A to 5A and Comparative Examples 1A to 4A

Preparation of Coloring Agent Dispersions

Coloring agent dispersions comprising a coloring agent coated with a water-insoluble polymer as dispersed particles were prepared by the following methods.

(Synthesis of Water-Insoluble Polymers 1 to 3)

Using 20 parts by weight of an organic solvent (methyl ethyl ketone), 0.03 part by weight of a polymerization chain transfer agent (2-mercaptoethanol), a polymerization initiator and monomers shown in Table 1, they were placed in a reaction vessel whose inner atmosphere had been sufficiently replaced by nitrogen gas, and polymerized at 75° C. under stirring. Based on 100 parts by weight of the monomer components, 0.9 part by weight of 2,2'-azobis(2,4-dumethylvaleronitrile) dissolved in 40 parts by weight of methyl ethyl ketone was added, followed by aging at 80° C. for 1 hour to obtain a polymer solution.

(Coloring Agent Dispersion 1)

Five parts obtained by drying under reduced pressure of the polymer solution obtained as water-insoluble polymer 1 was dissolved in 15 parts of methyl ethyl ketone, and the polymer was neutralized using an aqueous solution of sodium hydroxide. Further, 15 parts of C.I. Pigment Yellow 74 was added, and kneading was performed with a dispersing apparatus while water was added.

To the resulting kneaded product, 100 parts of ion exchange water was added, followed by stirring, and then, methyl ethyl ketone was removed at 60° C. under reduced pressure. Further, water was partially removed, thereby obtaining an aqueous dispersion of yellow pigment having a solid concentration of 20% by weight.

(Coloring Agent Dispersion 2)

Six parts obtained by drying under reduced pressure of the polymer solution obtained as water-insoluble polymer 2 was dissolved in 45 parts of methyl ethyl ketone, and the polymer was neutralized using an aqueous solution of sodium hydroxide. Further, 18 parts of C.I. Pigment Violet 19 was added, and kneading was performed with a dispersing apparatus while water was added.

To the resulting kneaded product, 120 parts of ion exchange water was added, followed by stirring, and then, methyl ethyl ketone was removed at 60° C. under reduced pressure. Further, water was partially removed, thereby obtaining an aqueous dispersion of magenta pigment having a solid concentration of 20% by weight.

(Coloring Agent Dispersion 3)

Eight parts obtained by drying under reduced pressure of the polymer solution obtained as water-insoluble polymer 3 was dissolved in 15 parts of methyl ethyl ketone, and the polymer was neutralized using an aqueous solution of sodium hydroxide. Further, 12 parts of C.I. Pigment Blue 15:4 was added, and kneading was performed with a dispersing apparatus while water was added.

To the resulting kneaded product, 100 parts of ion exchange water was added, followed by stirring, and then, methyl ethyl ketone was removed at 60° C. under reduced pressure. Further, water was partially removed, thereby obtaining an aqueous dispersion of cyan pigment having a solid concentration of 20% by weight.

[Preparation of Resin Emulsions]

Polymers constituting the resin emulsions can be prepared by the same methods as in the above-mentioned synthesis of water-insoluble polymers 1 to 3, using monomers shown in Table 2 in place of the monomers shown in Table 1.

TABLE 1

| Composition of Monomer Mixture (% by weight) | Water-Insoluble Polymer 1 | Water-Insoluble Polymer 2 | Water-Insoluble Polymer 3 |
|---|---|---|---|
| Methacrylic Acid | 20 | 15 | 20 |
| Styrene Monomer | 45 | 30 | 40 |
| Benzyl Methacrylate |  | 20 |  |
| Polyethylene Glycol Monomethacrylate (EO = 15) | 5 | 10 |  |
| Polypropylene Glycol Monomethacrylate (PO = 9) |  | 10 | 25 |
| Polyethylene Glycol•Propylene Glycol Monomethacrylate (EO = 5, PO = 7) | 10 |  | 5 |
| Styrene Macromonomer | 20 | 15 | 10 |
| Weight Average Molecular Weight | 90000 | 130000 | 70000 |

TABLE 2

| Composition of Monomer Mixture (% by weight) | Water-Insoluble Polymer 4 | Water-Insoluble Polymer 5 | Water-Insoluble Polymer 6 |
|---|---|---|---|
| Methacrylic Acid | 20 | 15 | 20 |
| Styrene Monomer | 40 | 30 | 42 |
| Benzyl Methacrylate | | 10 | |
| Polyethylene Glycol Monomethacrylate (EO = 15) | 15 | 20 | |
| Polypropylene Glycol Monomethacrylate (PO = 9) | | 15 | 25 |
| Polyethylene Glycol•Propylene Glycol Monomethacrylate (EO = 5, PO = 7) | 15 | | 3 |
| Styrene Macromonomer | 10 | 10 | 10 |
| Weight Average Molecular Weight | 200000 | 300000 | 85000 |

(Resin Emulsion 1)

Five parts obtained by drying under reduced pressure of the polymer solution obtained as water-insoluble polymer 4 was dissolved in 15 parts of methyl ethyl ketone, and the polymer was neutralized using an aqueous solution of sodium hydroxide. To this neutralized product, 100 parts of ion exchange water was added, followed by stirring, and then, methyl ethyl ketone was removed at 60° C. under reduced pressure. Further, water was partially removed, thereby obtaining resin emulsion 1 having a solid concentration of 15% by weight.

(Resin Emulsion 2)

Using the polymer solution obtained as water-insoluble polymer 5, resin emulsion 2 having a solid concentration of 15% by weight was obtained in the same manner as in resin emulsion 1.

(Resin Emulsion 3)

Using the polymer solution obtained as water-insoluble polymer 6, resin emulsion 3 having a solid concentration of 15% by weight was obtained in the same manner as in resin emulsion 1.

[Preparation of Inks]

Respective components were mixed at a ratio shown in Table 3, followed by stirring at room temperature for 2 hours. Then, the mixture was filtered through a membrane filter having a pore size of 5 μm to prepare each ink. The amounts added shown in Table 3 are all represented as weight % concentrations, and figures in parentheses of coloring agent dispersions indicate solid concentrations of the coloring agent dispersions. Further, the term "balance" of ion exchange water means to add ion exchange water to bring the total ink amount to 100 parts.

TABLE 3

| | Ink Composition | Example 1A | Example 2A | Example 3A | Example 4A | Example 5A |
|---|---|---|---|---|---|---|
| Coloring Agent | Coloring Agent Dispersion 1 | 36 (5.4) | | | | 30 (5) |
| | Coloring Agent Dispersion 2 | | 30 (4.5) | | 30 (4.5) | |
| | Coloring Agent Dispersion 3 | | | 30 (3.6) | | |
| | C.I. Pigment Yellow 74 (Styrene-Acrylic Resin Dispersion) | | | | | |
| Resin Emulsion | Resin Emulsion 1 | 6 | | 8 | 2 | |
| | Resin Emulsion 2 | | 2 | | | 6 |
| | Resin Emulsion 3 | | | | | |
| Polyhydric Alcohol | Glycerol | 10 | 10 | 15 | 12 | 10 |
| | Triethylene Glycol | 5 | 5 | | 2 | 5 |
| | 1,2-Hexanediol | 1 | 1 | 2 | | |
| | 1,5-Pentanediol | | | | 1 | 1 |
| Solid Wetting Agent | Trimethylolpropane | 2 | 2 | | 4 | |
| | Urea | | | 3 | | |
| Glycol Ether | DEGmBE | | | | 2 | |
| | TEGmBE | 2 | 2 | 2 | | 3 |
| | 2-Pyrrolidone | 1 | | 2 | | |
| | Olfine E1010 | 1 | 0.5 | 0.7 | | 1.5 |
| | Surfynol 104 | 0.5 | 0.3 | 0.7 | 1 | |
| | Triethanolamine | 1 | 1 | 1 | 1 | 1 |
| | EDTA | 0.02 | 0.02 | 0.02 | 0.02 | 0.02 |
| | Proxel XL2 | 0.3 | 0.3 | 0.3 | 0.3 | 0.3 |
| | Ion Exchange Water | balance | balance | balance | balance | balance |

| | Ink Composition | Comparative Example 1A | Comparative Example 2A | Comparative Example 3A | Comparative Example 4A |
|---|---|---|---|---|---|
| Coloring Agent | Coloring Agent Dispersion 1 | 30 (4.5) | | | |
| | Coloring Agent Dispersion 2 | | | | |
| | Coloring Agent Dispersion 3 | | 30 (3.6) | 30 (3.6) | |
| | C.I. Pigment Yellow 74 (Styrene-Acrylic Resin Dispersion) | | | | (4.5) |
| Resin Emulsion | Resin Emulsion 1 | | | | 3 |
| | Resin Emulsion 2 | | 8 | | |
| | Resin Emulsion 3 | | | 8 | |
| Polyhydric Alcohol | Glycerol | 10 | 15 | 15 | 12 |
| | Triethylene Glycol | 5 | | | 5 |
| | 1,2-Hexanediol | 1 | 2 | 2 | 1 |
| | 1,5-Pentanediol | | | | |

TABLE 3-continued

| Solid Wetting Agent | Trimethylolpropane | 2 | | | 2 |
|---|---|---|---|---|---|
| | Urea | | 3 | 3 | |
| Glycol Ether | DEGmBE | | | | |
| | TEGmBE | 2 | 2 | 2 | 2 |
| | 2-Pyrrolidone | | 2 | 2 | |
| | Olfine E1010 | 1 | 0.7 | 0.7 | 1 |
| | Surfynol 104 | 0.5 | 0.7 | 0.7 | 0.5 |
| | Triethanolamine | 1 | 1 | 1 | 1 |
| | EDTA | 0.02 | 0.02 | 0.02 | 0.02 |
| | Proxel XL2 | 0.3 | 0.3 | 0.3 | 0.3 |
| | Ion Exchange Water | balance | balance | balance | balance |

DEGmBE: Diethylene Glycol Monobutyl Ether
TEGmBE: Triethylene Glycol Monobutyl Ether
EDTA: Disodium Ethylenediaminetetraacetate (Test 1) Average Particle Size Each ink composition was diluted 1000 times with pure water, and the size distribution of the diluted solution was measured using a size distribution meter manufactured by Microtrac Inc.) to determine the volume average particle size.

(Test 2) Bronzing

For each ink composition, patch patterns of 100% and 50% duty were prepared, and printing was performed on EPSON Photopaper <Glossy> (trade name: manufactured by Seiko Epson Corporation) at a resolution of 1440 dpi, using an ink jet printer PX-V600. Visual observation was carried out under a fluorescent lamp (F11 light source) with changing the angle of printed matter, and changes in hue of reflected light were judged based on the following standards:

A: In both the patches, reflected light is white, and a hue having no feeling of strangeness can be observed.

B: In either of the patches, a color can be slightly confirmed in reflected light, but a hue having no feeling of strangeness can be observed.

C: A color can be confirmed in reflected light of printed matter, and a hue has a feeling of strangeness.

(Test 3) Glossiness

For the printed matter of test 2, the 20° gloss ($G_{20}$) was measured using a glossmeter, GM-268 (manufactured by Konica Minolta Co., Ltd.), and judgment was made based on the following standards from the results of the average value of gloss values. It was found that the glossiness did not agree with apparent glossy texture, even when the 60° gloss generally used as an index of the specular gloss of printed matter indicated a high value. As a result of intensive studies, it became clear that the gloss value at a visual field angle of 20° agreed with apparent glossy texture, so that the gloss at a visual field angle of 20° was taken as an index value in the invention.

A: $60 \leq G_{20}$
B: $45 \leq G_{20} < 60$
C: $G_{20} < 45$ (Test 4) Fixing Property For the printed matter of test 2, recorded matter was subjected to air seasoning for 24 hours after printing, and then, printed characters were scratched at a tool force of 300 g/15 mm using a yellow water-based highlighter pen ZEBRA PEN2 (registered trade mark) manufactured by Zebra Co., Ltd. Then, the presence or absence of stains was visually observed. The results thereof were judged based on the following standards:

A: Even when the same portion was scratched twice, no stain occurs at all.

B: When scratched once, no stain occurs, but when scratched twice, stains occur.

C: When scratched once, stains occur.

(Test 5) Gloss Change

For the printed matter of test 2, recorded matter was subjected to air seasoning for about 2 hours after printing, and then, lightly scratched with a finger. The presence or absence of a gloss change on a printing surface was visually observed. The results thereof were judged based on the following standards:

A: A trace of scratch with the finger can not be distinguished, and there is no gross change.

B: A trace of scratch with the finger can be somewhat distinguished, but there is scarcely a gloss change.

C: A trace of scratch with the finger can be distinguished.

(Test 6) Storage Stability

An ink was allowed to stand in a state in which 50 g of the ink was placed in an aluminum pack, under circumstances of 70° C. for 1 week. After standing, the presence or absence of the occurrence of foreign matter (sediment) and changes in physical properties (viscosity, surface tension, pH and particle size) for the ink in which no foreign matter occurred were judged based on the following standards:

A: No foreign matter occurs, and the physical properties do not change.

B: No foreign matter occurs, but the physical properties somewhat change.

C: Foreign matter occurs or the physical properties significantly change.

(Test 7) Ejection Stability

It was evaluated whether dot omission or fly bending of an ink occurs or not from the initiation of printing to the ink end in printing of test 2, and further, when it has occurred, how many times printer cleaning performed as a return operation to normal printing is necessary. Judgment was made based on the following standards:

A: No occurrence or once cleaning.
B: Twice or four times cleaning.
C: Five or more times cleaning.

(Test 8) Clogging Recovery

Using an ink jet printer PX-V600, each ink was charged in a head, and allowed to stand in a state where no ink cartridge was provided and at a position other than a home position (a state where the head was shifted from a position of a cap provided on the printer and the head was not capped) under circumstances of 40° C. for 1 week, after it was confirmed that the ink was ejected from all nozzles. After standing, the number of times of cleaning required until the ink composition was ejected again from all nozzles was examined, and judgment was made based on the following standards:

A: Once cleaning.
B: Twice to 5 times cleaning.
C: Six or more cleaning.

The above evaluation results are summarized in Table 4.

TABLE 4

|  | Example 1A | Example 2A | Example 3A | Example 4A | Example 5A | Comparative Example 1A | Comparative Example 2A | Comparative Example 3A | Comparative Example 4A |
|---|---|---|---|---|---|---|---|---|---|
| Test 1 | 100 nm | 120 nm | 90 nm | 120 nm | 100 nm | 100 nm | 90 nm | 90 nm | 160 nm |
| Test 2 | A | A | A | A | A | C | A | A | C |
| Test 3 | A | A | A | A | A | A | A | A | C |
| Test 4 | A | A | A | A | A | B | A | B | C |
| Test 5 | A | A | A | A | A | C | A | C | C |
| Test 6 | A | A | A | A | A | A | A | A | B |
| Test 7 | A | A | A | A | A | A | C | A | C |
| Test 8 | A | A | A | A | A | A | B | C | C |

As apparent from Table 4, the ink compositions of the invention are an ink composition capable of providing an image having excellent glossy texture to various recording media, particularly to a glossy recording medium. The bronzing phenomenon is decreased, and fixing property and scratch resistance such as gloss change are also good. Further, the ink compositions are excellent in storage stability, an good in ejection stability and clogging recovery, resulting in high reliability, so that they are an ink set suitable for use in an ink jet recording system.

Examples 1B to 5B and Comparative Examples 1B and 2B

Coloring Agent Dispersions

Coloring agent dispersions 1 to 3 prepared in Examples described above were used.

[Preparation of Resin Particles]

Resin dispersions (emulsions) in which resin particles were used as dispersed particles were prepared by the following methods. Whether a film was formed or not was visually judged by thinly coating an aluminum plate with the emulsion in circumstances of a room ambient temperature of about 25° C. Further, the particle size is a value of an average particle size by particle size measurement with a Microtrac UPA150 analyzer (manufactured by Microtrac Inc.).

(Production Method of Resin Particles 1)

A reaction vessel equipped with a stirrer, a reflux condenser, dropping equipment and a thermometer was charged with 1000 g of ion exchange water and 6.5 g of sodium lauryl sulfate, and the temperature was elevated to 70° C. under stirring while performing nitrogen replacement. The internal temperature was kept at 70° C., and 4 g of potassium persulfate was added as a polymerization initiator. After dissolution, an emulsion previously prepared by adding 20 g of acrylamide, 550 g of styrene, 200 g of butyl acrylate, 30 g of methacrylic acid and 1 g of triethylene glycol diacrylate were added to 450 g of ion exchange water and 2 g of sodium lauryl sulfate under stirring was continuously added dropwise into the reaction solution, taking 4 hours. After the termination of dropping, aging was performed for 3 hours.

The resulting aqueous emulsion was cooled to ordinary temperature, and then, ion exchange water and aqueous ammonia were added to adjust it to a solid content of 37% by weight and pH 8.

It was confirmed that the resulting aqueous emulsion did not induce film formation at a temperature of 40° C., and the average particle size of the resin particles was 40 nm.

(Production Method of Resin Particles 2)

A reaction vessel equipped with a stirrer, a reflux condenser, dropping equipment and a thermometer was charged with 800 g of ion exchange water and 1 g of sodium lauryl sulfate, and the temperature was elevated to 75° C. under stirring while performing nitrogen replacement. The internal temperature was kept at 75° C., and 6 g of potassium persulfate was added as a polymerization initiator. After dissolution, an emulsion previously prepared by adding 20 g of acrylamide, 600 g of methyl methacrylate, 215 g of butyl acrylate, 30 g of methacrylic acid and 5 g of triethylene glycol diacrylate were added to 450 g of ion exchange water and 2 g of sodium lauryl sulfate under stirring was continuously added dropwise into the reaction solution, taking 5 hours. After the termination of dropping, aging was performed for 3 hours. The resulting aqueous emulsion was cooled to ordinary temperature, and then, ion exchange water and an aqueous solution of sodium hydroxide were added to adjust it to a solid content of 40% by weight and pH 8.

It was confirmed that the resulting aqueous emulsion did not induce film formation at a temperature of 40° C., and the average particle size of the resin particles was 60 nm.

(Production Method of Resin Particles 3)

A reaction vessel equipped with a stirrer, a reflux condenser, dropping equipment and a thermometer was charged with 900 g of ion exchange water and 3 g of sodium lauryl sulfate, and the temperature was elevated to 70° C. under stirring while performing nitrogen replacement. The internal temperature was kept at 70° C., and 4 g of potassium persulfate was added as a polymerization initiator. After dissolution, an emulsion previously prepared by adding 20 g of acrylamide, 300 g of styrene, 640 g of butyl acrylate, 30 g of methacrylic acid and 5 g of triethylene glycol diacrylate were added to 450 g of ion exchange water and 3 g of sodium lauryl sulfate under stirring was continuously added dropwise into the reaction solution, taking 4 hours. After the termination of dropping, aging was performed for 3 hours. The resulting aqueous emulsion was cooled to ordinary temperature, and then, ion exchange water and a 5% aqueous solution of sodium hydroxide were added to adjust it to a solid content of 40% by weight and pH 8.

It was confirmed that the resulting aqueous emulsion did not induce film formation at a room ambient temperature of 40° C., and the average particle size of the resin particles was 90 nm.

(Production Method of Resin Particles 4)

A reaction vessel equipped with a stirrer, a reflux condenser, dropping equipment and a thermometer was charged with 800 g of ion exchange water and 1 g of sodium lauryl sulfate, and the temperature was elevated to 75° C. under stirring while performing nitrogen replacement. The internal temperature was kept at 75° C., and 6 g of potassium persulfate was added as a polymerization initiator. After dissolution, an emulsion previously prepared by adding 20 g of acrylamide, 600 g of methyl methacrylate, 215 g of butyl acrylate and 30 g of methacrylic acid were added to 450 g of ion exchange water and 2 g of sodium lauryl sulfate under stirring was continuously added dropwise into the reaction solution, taking 5 hours. After the termination of dropping, aging was performed for 3 hours. The resulting aqueous emulsion was cooled to ordinary temperature, and then, ion exchange water and an aqueous solution of sodium hydroxide were added to adjust it to a solid content of 40% by weight and pH 8.

It was confirmed that the resulting aqueous emulsion did not induce film formation at a temperature of 40° C., and the average particle size of the resin particles was 70 nm.

[Preparation of Inks]

Respective components were mixed at a ratio shown in Table 5, followed by stirring at room temperature for 2 hours. Then, the mixture was filtered through a membrane filter having a pore size of 5 μm to prepare each ink. The amounts added shown in Table 5 are all represented as weight % concentrations, and figures in parentheses of coloring agents dispersions indicate solid concentrations of the coloring agent dispersions. Further, the term "balance" of ion exchange water means to add ion exchange water to bring the total ink amount to 100 parts.

TABLE 5

| Ink Composition | | Example 1B | Example 2B | Example 3B | Example 4B | Example 5B |
|---|---|---|---|---|---|---|
| Coloring Agent | Coloring Agent Dispersion 1 | 36 (5.4) | | | | 30 (5) |
| | Coloring Agent Dispersion 2 | | 30 (4.5) | | 30 (4.5) | |
| | Coloring Agent Dispersion 3 | | | 20 (3) | | |
| | C.I. Pigment Yellow 74 (Styrene-Acrylic Resin Dispersion) | | | | | |
| Resin Particles (Emulsion) | Resin Emulsion 1 | 3 | | | | 3 |
| | Resin Emulsion 2 | | 2.5 | | | 6 |
| | Resin Emulsion 3 | | | | 2.5 | |
| | Resin Emulsion 4 | | | 4 | | |
| Polyhydric Alcohol | Glycerol | 10 | 10 | 15 | 12 | 10 |
| | Triethylene Glycol | 5 | 5 | | 2 | 5 |
| | 1,2-Hexanediol | 1 | 1 | 2 | | |
| | 1,5-Pentanediol | | | | 1 | 1 |
| Solid Wetting Agent | Trimethylolpropane | 2 | 2 | | 4 | |
| | Urea | | | 3 | | |
| Glycol Ether | DEGmBE | | | | 2 | |
| | TEGmBE | 2 | 2 | 2 | | 3 |
| | 2-Pyrrolidone | 1 | | 2 | | |
| | Olfine E1010 | 1 | 0.5 | 0.7 | | 1.5 |
| | Surfynol 104 | 0.5 | 0.3 | 0.7 | 1 | |
| | Triethanolamine | 1 | 1 | 1 | 1 | 1 |
| | EDTA | 0.02 | 0.02 | 0.02 | 0.02 | 0.02 |
| | Proxel XL2 | 0.3 | 0.3 | 0.3 | 0.3 | 0.3 |
| | Ion Exchange Water | balance | balance | balance | balance | balance |

| Ink Composition | | Comparative Example 1B | Comparative Example 2B |
|---|---|---|---|
| Coloring Agent | Coloring Agent Dispersion 1 | 30 (4.5) | |
| | Coloring Agent Dispersion 2 | | |
| | Coloring Agent Dispersion 3 | | |
| | C.I. Pigment Yellow 74 (Styrene-Acrylic Resin Dispersion) | | (4.5) |
| Resin Emulsion | Resin Emulsion 1 | | 3 |
| | Resin Emulsion 2 | | |
| | Resin Emulsion 3 | | |
| | Resin Emulsion 4 | | |
| Polyhydric Alcohol | Glycerol | 10 | 12 |
| | Triethylene Glycol | 5 | 5 |
| | 1,2-Hexanediol | 1 | 1 |
| | 1,5-Pentanediol | | |
| Solid Wetting Agent | Trimethylolpropane | 2 | 2 |
| | Urea | | |
| Glycol Ether | DEGmBE | | |
| | TEGmBE | 2 | 2 |
| | 2-Pyrrolidone | | |
| | Olfine E1010 | 1 | 1 |
| | Surfynol 104 | 0.5 | 0.5 |
| | Triethanolamine | 1 | 1 |
| | EDTA | 0.02 | 0.02 |
| | Proxel XL2 | 0.3 | 0.3 |
| | Ion Exchange Water | balance | balance |

DEGmBE: Diethylene Glycol Monobutyl Ether
TEGmBE: Triethylene Glycol Monobutyl Ether
EDTA: Disodium Ethylenediaminetetraacetate These ink compositions were evaluated in the same manners as with tests 1 to 8 carried out for Examples 1A to 5A and Comparative Examples 1A to 4A. The evaluation results are summarized in Table 6.

TABLE 6

|  | Example 1B | Example 2B | Example 3B | Example 4B | Example 5B | Comparative Example 1B | Comparative Example 2B |
|---|---|---|---|---|---|---|---|
| Test 1 | 100 nm | 120 nm | 80 nm | 120 nm | 100 nm | 100 nm | 160 nm |
| Test 2 | A | A | A | B | A | C | C |
| Test 3 | A | A | A | B | A | A | C |
| Test 4 | A | A | A | A | A | B | C |
| Test 5 | A | A | A | B | A | C | C |
| Test 6 | A | A | A | A | A | A | B |
| Test 7 | A | A | A | A | A | A | C |
| Test 8 | A | A | A | A | A | A | C |

As apparent from Table 6, the ink compositions of the invention are an ink composition capable of providing an image having excellent glossy texture to various recording media, particularly to a glossy recording medium. The bronzing phenomenon is decreased, and fixing property and scratch resistance such as gloss change are also good. Further, the ink compositions are excellent in storage stability, an good in ejection stability and clogging recovery, resulting in high reliability, so that they are an ink set suitable for use in an ink jet recording system.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2005-090808 and 2005-090809 filed Mar. 28, 2005, and the contents thereof are herein incorporated by reference.

INDUSTRIAL APPLICABILITY

The invention is not limited to the above-mentioned embodiments, and can also be applied to applications such as ink for writing materials and ink for offset printing.

The invention claimed is:

1. An ink composition comprising at least a pigment coated with a water-insoluble polymer as a coloring material, a resin emulsion as an additive, water and a water-soluble organic compound, wherein the weight average molecular weight of the water-insoluble polymer is from 50,000 to 150,000, wherein the resin emulsion comprises a resin comprising a monomer component of the same kind as the monomer component constituting the water-insoluble polymer and having a weight average molecular weight of 1.5 to 4 times that of the water-insoluble polymer, wherein the average particle size of the resin emulsion is from 20 to 200 nm, and wherein the average particle size of pigment particles in the ink composition ranges from 50 to 150 nm.

2. The ink composition according to claim 1, wherein the coloring agent is a coloring agent insoluble in water.

3. The ink composition according to claim 1, wherein the water-insoluble polymer and a polymer constituting the resin emulsion are branched polymers.

4. The ink composition according to claim 1, wherein it is used in an ink jet recording system.

5. The ink composition according to claim 1, wherein a weight ratio of the coloring agent and the water-insoluble polymer is from 1:0.2 to 1:1.

6. The ink composition according to claim 1, wherein the water-soluble organic compound comprises at least a polyhydric alcohol, a solid wetting agent and a butyl ether of a glycol.

7. The ink composition according to claim 6, wherein the polyhydric alcohol comprises two or more members selected from glycerol, diethylene glycol, triethylene glycol, 1,5-pentanediol and 1,2-hexanediol, the solid wetting agent is trimethylolethane, trimethylolpropane or urea, and the butyl glycol is diethylene glycol monobutyl ether or triethylene glycol monobutyl ether.

8. The ink composition according to claim 1, wherein the water-insoluble polymer comprises a copolymer resin of a hydrophobic group-containing monomer and a hydrophilic group-containing monomer and contains at least a residue of a monomer having a salt-forming group.

9. The ink composition according to claim 8, wherein the hydrophilic group-containing monomer is at least one member selected from the group consisting of polyethylene glycol monomethacrylate, polypropylene glycol monomethacrylate and ethylene glycol.propylene glycol monomethacrylate.

10. A recording method comprising a step of rendering the ink composition according to claim 1 to attach onto a recording medium to perform printing.

11. The recording method according to claim 10, wherein the method further comprises a step of ejecting droplets of the ink, and the droplets are rendered to attach onto the recording medium to perform printing.

12. Recorded matter recorded by the recording method according to claim 10.

* * * * *